(12) United States Patent
Lugo et al.

(10) Patent No.: US 8,843,354 B2
(45) Date of Patent: Sep. 23, 2014

(54) CAPACITY PLANNING

(75) Inventors: Wilfredo E. Lugo, Rincon, PR (US); Luis G. Chardon, Aguadilla, PR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 809 days.

(21) Appl. No.: 12/990,463

(22) PCT Filed: Jun. 19, 2008

(86) PCT No.: PCT/US2008/067447
§ 371 (c)(1),
(2), (4) Date: Oct. 29, 2010

(87) PCT Pub. No.: WO2009/154623
PCT Pub. Date: Dec. 23, 2009

(65) Prior Publication Data
US 2011/0060561 A1    Mar. 10, 2011

(51) Int. Cl.
*G06F 17/50* (2006.01)
*G06F 11/26* (2006.01)
*G06F 13/10* (2006.01)

(52) U.S. Cl.
CPC .......... *G06F 17/5009* (2013.01); *G06F 11/261* (2013.01); *G06F 17/50* (2013.01); *G06F 13/105* (2013.01); *G06F 2217/04* (2013.01)
USPC ....................................... 703/6; 703/1; 703/2

(58) Field of Classification Search
None
See application file for complete search history.

(56) References Cited

U.S. PATENT DOCUMENTS

| 5,995,729 | A  | * | 11/1999 | Hirosawa et al. | ................. | 703/1 |
| 6,574,104 | B2 | * | 6/2003 | Patel et al. | .................... | 361/695 |
| 6,694,759 | B1 | * | 2/2004 | Bash et al. | ...................... | 62/180 |
| 6,775,997 | B2 | * | 8/2004 | Bash et al. | ...................... | 62/180 |
| 6,813,897 | B1 | * | 11/2004 | Bash et al. | ...................... | 62/175 |
| 6,819,563 | B1 | * | 11/2004 | Chu et al. | ...................... | 361/696 |
| 6,862,179 | B2 | * | 3/2005 | Beitelmal et al. | ........ | 361/679.53 |
| 7,020,586 | B2 | * | 3/2006 | Snevely | ........................... | 703/1 |

(Continued)

FOREIGN PATENT DOCUMENTS

| CN | 1908590 | | 2/2007 |
| JP | 2003216660 | A | 7/2003 |
| JP | 2006040095 | A | 9/2006 |
| WO | 2009/154623 | A1 | 12/2009 |

OTHER PUBLICATIONS

"Thermal Considertions in Cooling Large Scale High Compute Density Data Centers", Patel, C.D.etc. The Eighth Intersociety Conference on Thermal and Thermomechanical Phenomena in Electronic Systems, 767-776.

(Continued)

*Primary Examiner* — Shambhavi Patel

(57) ABSTRACT

Included are embodiments for capacity planning. At least one embodiment includes a computer fluid dynamics (CFD) component configured to model a data center, the data center including at least one component and a monitor component (283) configured to receive data associated with the modeled data center and translate the received data for 3-dimensional (3-D) modeling. Some embodiments include a diagnostics component configured to determine via a processor, from the 3-D modeling, at least one point of potential error and a 3-dimensional (3-D) visualization component configured to receive the translated data and provide a 3-D visualization of the data center, the 3-D visualization configured to provide visual representation of the at least one point of potential error.

20 Claims, 13 Drawing Sheets

(56) References Cited

U.S. PATENT DOCUMENTS

| | | | |
|---|---|---|---|
| 7,085,133 B2* | 8/2006 | Hall | 361/695 |
| 7,197,433 B2* | 3/2007 | Patel et al. | 702/188 |
| 7,295,960 B2* | 11/2007 | Rappaport et al. | 703/13 |
| 7,386,426 B1* | 6/2008 | Black et al. | 703/2 |
| 7,596,476 B2* | 9/2009 | Rasmussen et al. | 703/2 |
| 7,620,613 B1* | 11/2009 | Moore et al. | 706/62 |
| 7,630,867 B2* | 12/2009 | Behrens et al. | 703/2 |
| 7,676,280 B1* | 3/2010 | Bash et al. | 700/17 |
| 7,726,144 B2* | 6/2010 | Larson et al. | 62/259.2 |
| 7,756,667 B2* | 7/2010 | Hamann et al. | 702/130 |
| 7,864,530 B1* | 1/2011 | Hamburgen et al. | 361/699 |
| 7,881,910 B2* | 2/2011 | Rasmussen et al. | 703/1 |
| 7,885,795 B2* | 2/2011 | Rasmussen et al. | 703/5 |
| 7,970,592 B2* | 6/2011 | Behrens et al. | 703/2 |
| 7,991,592 B2* | 8/2011 | VanGilder et al. | 703/1 |
| 8,009,430 B2* | 8/2011 | Claassen et al. | 361/724 |
| 8,090,476 B2* | 1/2012 | Dawson et al. | 700/276 |
| 8,131,515 B2* | 3/2012 | Sharma et al. | 703/1 |
| 8,160,838 B2* | 4/2012 | Ramin et al. | 702/188 |
| 8,175,753 B2* | 5/2012 | Sawczak et al. | 700/276 |
| 8,244,502 B2* | 8/2012 | Hamann et al. | 703/1 |
| 8,315,841 B2* | 11/2012 | Rasmussen et al. | 703/1 |
| 8,346,398 B2* | 1/2013 | Ahmed et al. | 700/278 |
| 8,355,890 B2* | 1/2013 | VanGilder et al. | 702/182 |
| 8,401,793 B2* | 3/2013 | Nghiem et al. | 702/3 |
| 8,401,833 B2* | 3/2013 | Radibratovic et al. | 703/13 |
| 8,645,722 B1* | 2/2014 | Weber et al. | 713/300 |
| 8,712,735 B2* | 4/2014 | VanGilder et al. | 703/1 |
| 8,725,307 B2* | 5/2014 | Healey et al. | 700/300 |
| 2004/0065097 A1* | 4/2004 | Bash et al. | 62/180 |
| 2004/0065104 A1* | 4/2004 | Bash et al. | 62/259.2 |
| 2004/0075984 A1* | 4/2004 | Bash et al. | 361/695 |
| 2004/0089009 A1* | 5/2004 | Bash et al. | 62/259.2 |
| 2004/0089011 A1* | 5/2004 | Patel et al. | 62/259.2 |
| 2005/0023363 A1* | 2/2005 | Sharma et al. | 236/49.3 |
| 2005/0192680 A1* | 9/2005 | Cascia et al. | 700/29 |
| 2005/0225936 A1* | 10/2005 | Day | 361/687 |
| 2005/0267639 A1* | 12/2005 | Sharma et al. | 700/276 |
| 2006/0161403 A1* | 7/2006 | Jiang et al. | 703/2 |
| 2007/0038414 A1* | 2/2007 | Rasmussen et al. | 703/1 |
| 2007/0062685 A1* | 3/2007 | Patel et al. | 165/247 |
| 2007/0078635 A1* | 4/2007 | Rasmussen et al. | 703/1 |
| 2007/0089446 A1 | 4/2007 | Larson et al. | |
| 2007/0174024 A1* | 7/2007 | Rasmussen et al. | 703/1 |
| 2008/0204999 A1* | 8/2008 | Clidaras et al. | 361/696 |
| 2008/0269932 A1* | 10/2008 | Chardon et al. | 700/98 |
| 2008/0288193 A1* | 11/2008 | Claassen et al. | 702/61 |
| 2009/0012633 A1* | 1/2009 | Liu et al. | 700/90 |
| 2009/0113323 A1* | 4/2009 | Zhao et al. | 715/764 |
| 2009/0150123 A1* | 6/2009 | Archibald et al. | 703/1 |
| 2009/0168345 A1* | 7/2009 | Martini | 361/691 |
| 2009/0182812 A1* | 7/2009 | Bajpay et al. | 709/205 |
| 2009/0326879 A1* | 12/2009 | Hamann et al. | 703/2 |
| 2009/0326884 A1* | 12/2009 | Amemiya et al. | 703/6 |
| 2011/0040876 A1* | 2/2011 | Zhang et al. | 709/226 |
| 2011/0060561 A1* | 3/2011 | Lugo et al. | 703/1 |
| 2011/0246147 A1* | 10/2011 | Rasmussen et al. | 703/2 |
| 2011/0251933 A1* | 10/2011 | Egnor et al. | 705/30 |
| 2012/0054527 A1* | 3/2012 | Pfeifer et al. | 713/340 |
| 2012/0109404 A1* | 5/2012 | Pandey et al. | 700/299 |
| 2012/0150509 A1* | 6/2012 | Shiel | 703/2 |
| 2013/0096829 A1* | 4/2013 | Kato et al. | 701/533 |
| 2013/0166258 A1* | 6/2013 | Hamann et al. | 703/2 |
| 2013/0317785 A1* | 11/2013 | Chainer et al. | 703/1 |
| 2014/0074444 A1* | 3/2014 | Hamann et al. | 703/2 |
| 2014/0142904 A1* | 5/2014 | Drees et al. | 703/2 |
| 2014/0142905 A1* | 5/2014 | Drees et al. | 703/2 |

OTHER PUBLICATIONS

CN Office Action cited in Appl. No. 200880129888.1 dated May 16, 2012; 4 pages.

Patent Cooperation Treaty, "International Search Report," issued by the International Searching Authority in connection with related PCT application No. PCT/US2008/067447, mailed Jan. 29, 2009 (3 pages).

Patent Cooperation Treaty, "Written Opinion of the International Searching Authority," issued by the International Searching Authority in connection with related PCT application No. PCT/US2008/067447, mailed Jan. 29, 2009 (6 pages).

EP; "Supplementary European Search Report" cited in EP 08771441; Nov. 30, 2012; 8 pages.

Schmidt R R et al "Challenges of data center thermal management", IBM Journal of Research and Development, International Business Machines Corporation NY, US. vol. 49, Sep. 1, 2005 pp. 709-723. XP002458425, ISSN: 0018-8646.

* cited by examiner

CAPACITY PLANNING

BACKGROUND

This patent arises from a US National Phase entry of International Patent Application Serial No. PCT/US2008/067447, filed Jun. 19, 2008, which is hereby incorporated by reference herein in its entirety.

Data centers, which may include any collection of computing and/or communication components, may be configured to provide computing and/or communications capabilities to one or more users. As the size of a data center increases, the number of components and/or the size of equipment utilized may increase. Accordingly, in many data centers resources, such as cooling, power, and other environmental resources may be in demand. While allocation of such resources may be manually configured upon creation of the data center, oftentimes, such a solution is far from ideal because as the manual configuration may result in miscalculations. Additionally, as demands of the data center change over time, such manual solutions may be ineffective.

SUMMARY

Included are embodiments for capacity planning. At least one embodiment includes a computer fluid dynamics (CFD) component configured to model a data center, the data center including at least one component and a monitor component configured to receive data associated with the modeled data center and translate the received data for 3-dimensional (3-D) modeling. Some embodiments include a diagnostics component configured to determine, from the 3-D modeling, at least one point of potential error and a 3-dimensional (3-D) visualization component configured to receive the translated data and provide a 3-D visualization of the data center, the 3-D visualization configured to provide visual representation of the at least one point of possible error.

Also included are embodiments of a method. At least one embodiment of a method includes receiving thermal data associated with at least one component at a data center and performing at least one calculation on the thermal data to determine a 3-dimensional (3-D) model of the data center. Some embodiments include determining, from the 3-D modeling, at least one point of potential error and providing, from the received translated data, a 3-D visualization of the data center, the 3-D visualization configured to provide visual representation of the at least one point of possible error.

Other embodiments and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

As the demands of data centers evolve, thermal capacity data may be utilized for optimization of the data center. At least one embodiment disclosed herein includes visually comparing current data center thermal operation with the maximum operation, as predicted by computer fluid dynamics (CFD) to provide visual capacity planning.

Figure 1:
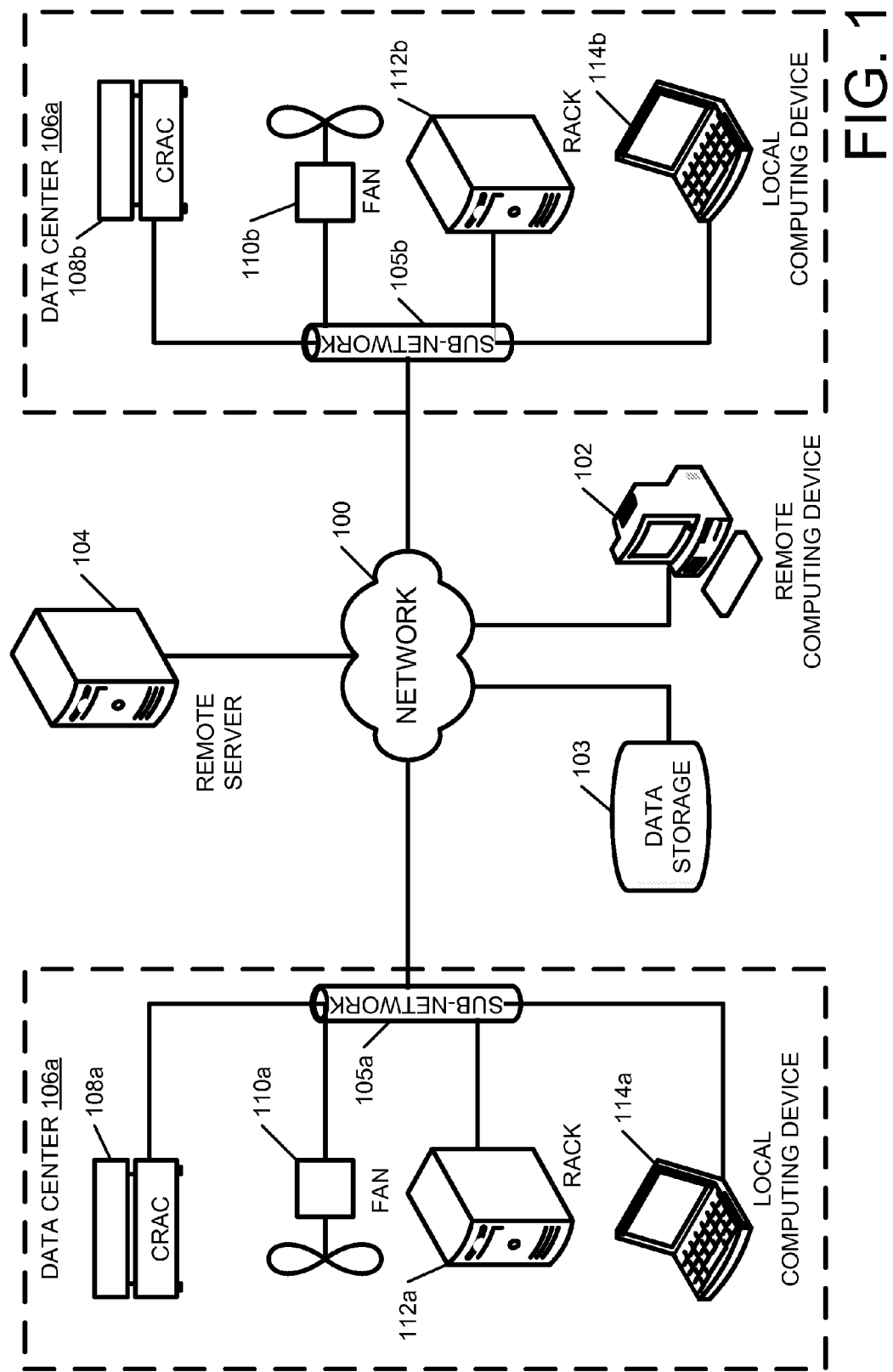
FIG. 1 illustrates an exemplary embodiment of a communications network, which may be configured to facilitate communication of data.

Referring to the drawings, FIG. 1 illustrates an exemplary embodiment of a communications network, which may be configured to facilitate communication of data. More specifically, as illustrated in the nonlimiting example of FIG. 1, a network 100 may be utilized and include a wide area network (WAN), such as the internet, a public switched telephone network (PSTN), a mobile communications network (MCN) and/or other network. Similarly, the network 100 may include a wireline and/or a wireless Local Area Network (LAN). Regardless of the communications medium and protocol, the network 100 may be coupled to one or more remote computing devices 102, remote servers 104, data storage components 103, and/or one or more data centers 106a, 106b.

More specifically, the data center 106a may include a subnetwork 105a for facilitating communication of data and/or power to the equipment of the data center 106a. As illustrated, the data center 106 may include one or more computer room air conditioning units (CRACs) 108a for providing ventilation and/or cooling. Similarly, the data center 106a may include a fan 110a for further facilitating cooling of the data center equipment. The data center 106a may also include one or more racks 112 and/or one or more local computing devices for providing information to users. Similarly, the network 100 may be coupled to one or more other data centers 106*b*, which may include a CRAC 108*b*, fan 110*b*, rack 112*b*, local computing device 114*b*, and/or other equipment.

Figure 2:
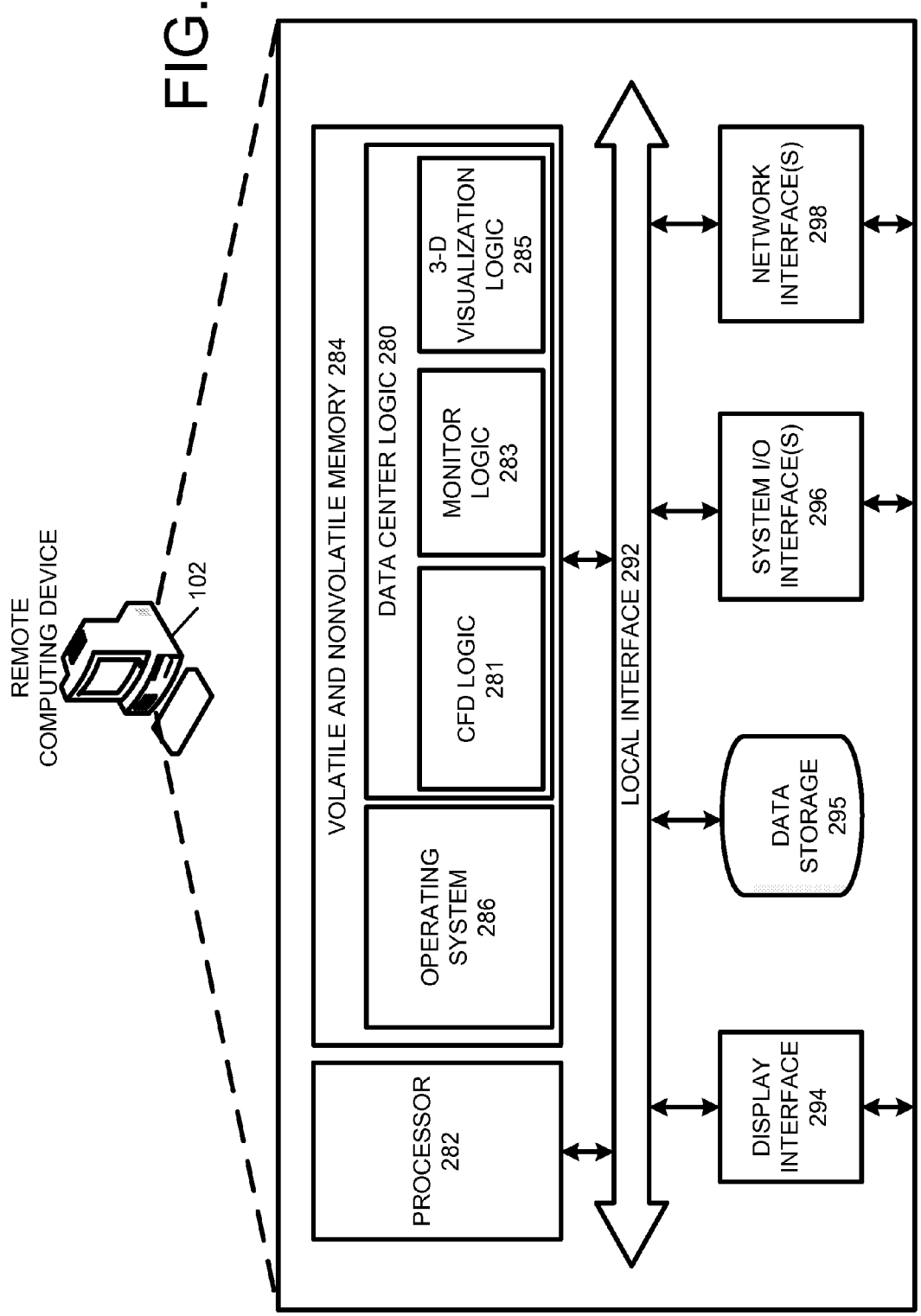
FIG. 2 illustrates an exemplary embodiment of a remote computing device, which may be configured to provide options for uploading and/or downloading content, such as in the network configuration from FIG. 1.

FIG. 2 illustrates an exemplary embodiment of a remote computing device 102, which may be configured to provide options for uploading and/or downloading content, such as in the network from FIG. 1. Although a wire-line device (e.g., the remote computing device 102*a*) is illustrated, this discussion can be applied to wireless devices, as well. According to exemplary embodiments, in terms of hardware architecture, the remote computing device 102 includes a processor 282, a memory component 284, a display interface 294, data storage 295, one or more input and/or output (I/O) device interface(s) 296, and/or one or more network interfaces 298 that are communicatively coupled via a local interface 292. The local interface 292 can include, for example but not limited to, one or more buses and/or other wired or wireless connections. The local interface 292 may have additional elements, which are omitted for simplicity, such as controllers, buffers (caches), drivers, repeaters, and receivers to enable communications. Further, the local interface 292 may include address, control, and/or data connections to enable appropriate communications among the aforementioned components. The processor 282 may be a device for executing software, particularly software stored in the memory component 284. The processor 282 can include any custom made or commercially available processor, a central processing unit (CPU), an auxiliary processor among several processors associated with the remote computing device 102, a semiconductor based microprocessor (in the form of a microchip or chip set), a macroprocessor, and/or generally any device for executing software instructions.

The memory component 284 can include any one or combination of volatile memory elements (e.g., random access memory (RAM, such as DRAM, SRAM, SDRAM, etc.)) and/or nonvolatile memory elements (e.g., ROM, hard drive, tape, CDROM, etc.). Moreover, the memory component 284 may incorporate electronic, magnetic, optical, and/or other types of storage media. One should note that the memory 284 can have a distributed architecture (where various components are situated remote from one another), but can be accessed by the processor 282.

The logic in the memory component 284 may include one or more separate programs, which may include an ordered listing of executable instructions for implementing logical functions. In the example of FIG. 2, the logic in the memory component 284 may include an operating system 286 and data center logic 280, which may include CFD logic 281, monitor logic 283, and 3-D visualization logic 287. The operating system 286 may be configured to control the execution of other computer programs and provides scheduling, input-output control, file and data management, memory management, and communication control and related services. The other pieces of logic 281, 283, and 285 may be configured to operate, as discussed below.

A system component and/or module embodied as software may also be construed as a source program, executable program (object code), script, or any other entity comprising a set of instructions to be performed. When constructed as a source program, the program is translated via a compiler, assembler, interpreter, or the like, which may or may not be included within the memory component 284, so as to operate properly in connection with the operating system 286.

The input/output devices that may be coupled to the system I/O Interface(s) 296 may include input devices, for example but not limited to, a keyboard, mouse, scanner, touch screen, microphone, etc. Further, the Input/Output devices may also include output devices, for example but not limited to, a printer, display, speaker, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

Additionally included are one or more of the network interfaces 298 for facilitating communication with one or more other devices. More specifically, network interface 298 may include any component configured to facilitate a connection with another device. While in some embodiments, among others, the remote computing device 102 can include the network interface 298 that includes a Personal Computer Memory Card International Association (PCMCIA) card (also abbreviated as "PC card") for receiving a wireless network card, this is a nonlimiting example. Other configurations can include the communications hardware within the remote computing device 102, such that a wireless network card is unnecessary for communicating wirelessly. Similarly, other embodiments include the network interfaces 298 for communicating via a wired connection. Such interfaces may be configured with Universal Serial Bus (USB) interfaces, serial ports, and/or other interfaces.

If the remote computing device 102 includes a personal computer, workstation, or the like, the software in the memory 284 may further include a basic input output system (BIOS) (omitted for simplicity). The BIOS is a set of software routines that initialize and test hardware at startup, start the operating system 286, and support the transfer of data among the hardware devices. The BIOS is stored in ROM so that the BIOS can be executed when the remote computing device 102 is activated.

When the remote computing device 102 is in operation, the processor 282 may be configured to execute software stored within the memory component 284, to communicate data to and from the memory component 284, and to generally control operations of the remote computing device 102 pursuant to the software. Software in the memory component 284, in whole or in part, may be read by the processor 282, perhaps buffered within the processor 282, and then executed.

One should note that while the description with respect to FIG. 2 includes the remote computing device 102 as a single component, this is a nonlimiting example. More specifically, in at least one embodiment, the remote computing device 102 can include a plurality of servers, personal computers, telephones, and/or other devices. Similarly, while the description of FIG. 2 describes the remote computing device 102 as a personal computer, this is also a nonlimiting example. More specifically, depending on the particular exemplary embodiment, other components, such as the servers and/or racks may include similar elements and/or logic.

Additionally, while the logic is illustrated in FIG. 2 as including discrete software components, this is also a nonlimiting example. In at least one embodiment, the logic 280, 281, 238, 285 may each include one or more components, embodied in software, hardware, and/or firmware. Additionally, while the logic is depicted as residing on a single device, such as remote computing device 102, the logic may include one or more components residing in one or more different devices.

Referring again to the logic components 281, 283, and 285, the three dimensional (3-D) visualization logic 285 may be configured to interact with the monitor logic 283. The 3-D visualization logic may also be configured to utilize results from the CFD logic 281 as a thermal maximum limit and provide a visual output of the differences between current operations and CFD predictions. In this way, a technician and/or user may be able to determine whether the data center 106 is under-provisioned or over-provisioned and would be able to plan equipment acquisitions, cooling enhancements, and/or power enhancements across time. Additionally, such implementations may be configured to plan equipment acquisitions, cooling enhancements, power enhancements, and/or equipment location changes.

The CFD logic 281 may include a framework for extracting CFD generated data from commercial tools and translate this data into a 3-D visualization format. Some embodiments may be configured to not only extract equipment data, but also extract data regarding the physical space where the equipment resides. Since the CFD logic 281 may be configured with most data center components and geometries, a full data center layout may be modeled by the CFD logic. Some embodiments may be configured to utilize extensible markup language (XML) as an abstraction layer between CFD logic 281 and the 3-D visualization logic 287.

The monitor logic 283 may be configured to determine how to receive and/or utilize the monitoring data of data center equipment (108, 110, 112, 114), as well as how to translate the monitoring data into a format such that the 3-D visualization logic 285 can render the desired graphics. Similarly, the 3-D visualization logic 285 may be configured to create an interactive 3-D scene containing data center equipment and/or components using the layout data. Similarly, the 3-D visualization logic 285 may be further configured to aggregate the CFD data for representation using one or more different visualization models.

Figure 4:
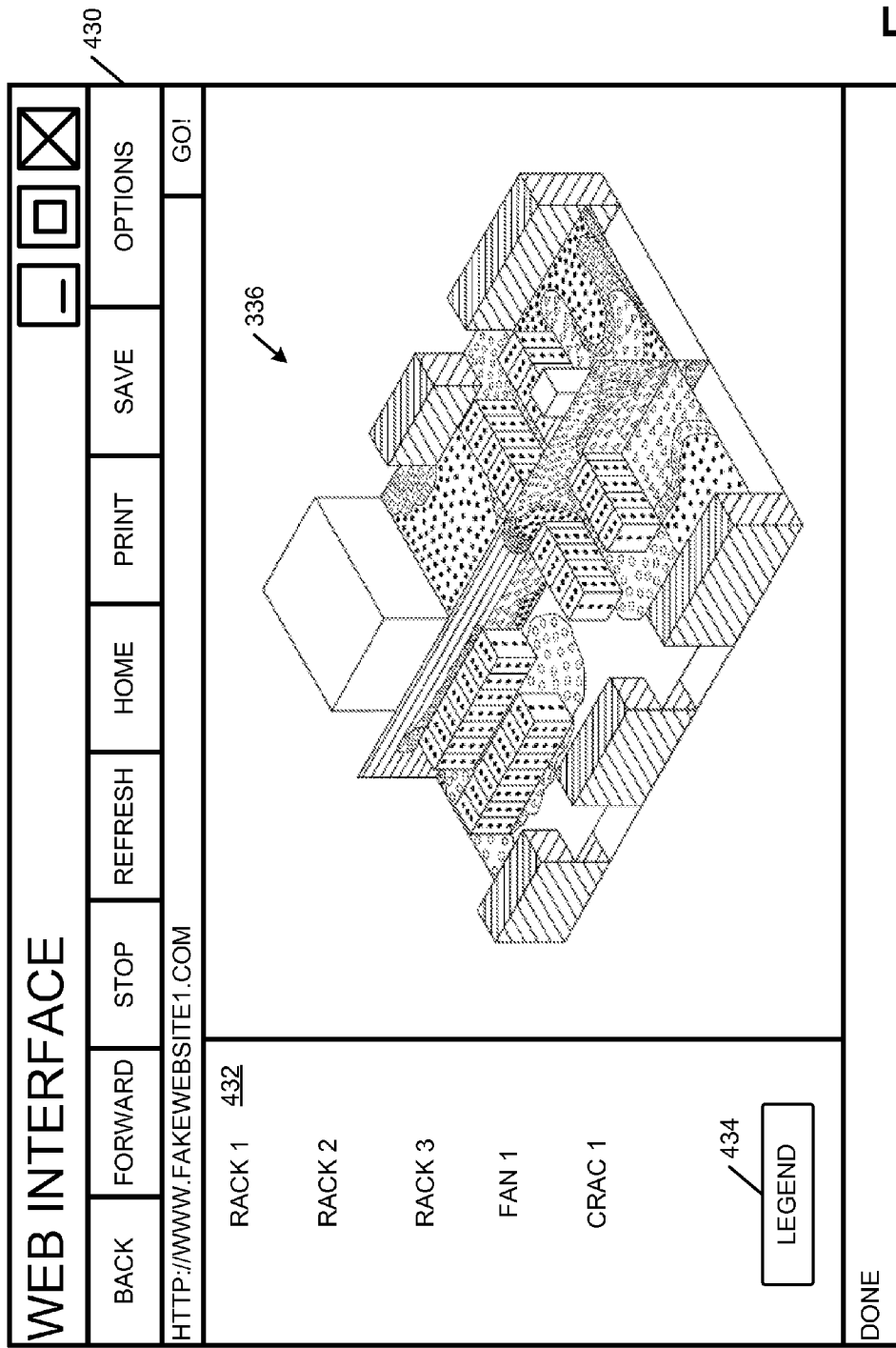
FIG. 4 depicts another exemplary 3-D modeling of a data center, similar to the modeling of the data center, from FIG. 3.
Figure 5:
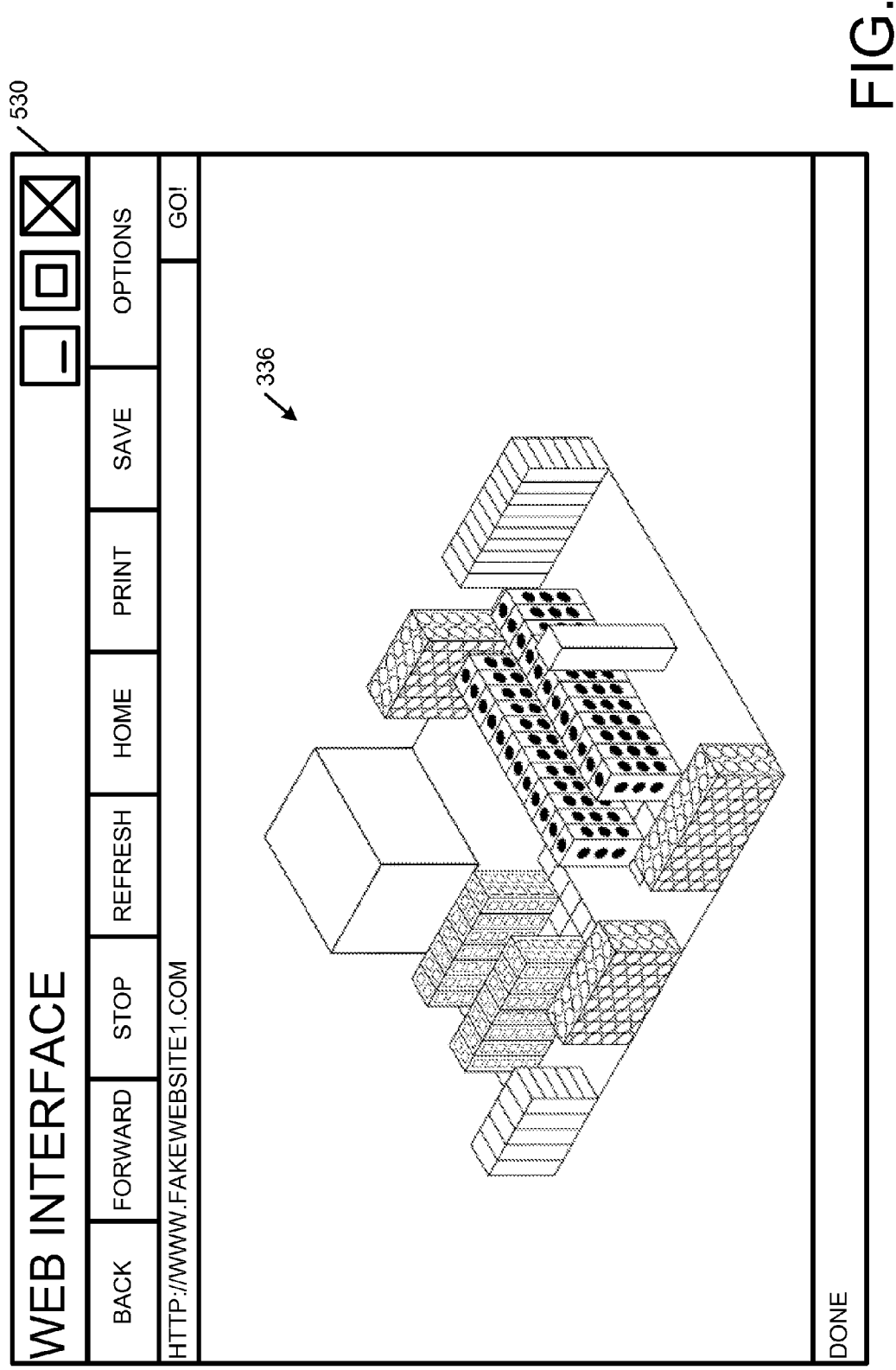
FIG. 5 depicts an additional exemplary 3-D model of the data center under current monitoring the data center under current monitoring, similar to the diagram from FIG. 4.

These models may vary, depending on the particular logic used. The CFD data may be represented using one or more different indicator schemes, (such as false coloring, shading, etc.), which may vary depending on what type of data is being analyzed. As illustrated in FIGS. 4 and 5, the indicator schemes may be displayed on the objects' surfaces, in planes that either dissect objects when placed parallel to the axis or placed in front of the objects and/or as a particle system in the scene. In cases where the logic is dynamic (e.g., "live streaming"), the color scheme may be changed dynamically to represent the current data.

Similarly, the 3-D visualization logic 285 may be configured to provide a user interface with information and controls, such as a menu bar with general options and/or a side panel with features like a legend for color/shading scale and a device tree list, as discussed below, with regard to FIGS. 4-11. In such embodiments, a user can select a device in the 3-D scene and zoom-in to see additional information about the selected device. Exemplary devices may include the racks 112 (which may include servers and/or other computational equipment), computer room air conditioning units (CRACs) 108, fans 110, vent tiles, and/or other equipment.

Figure 3:
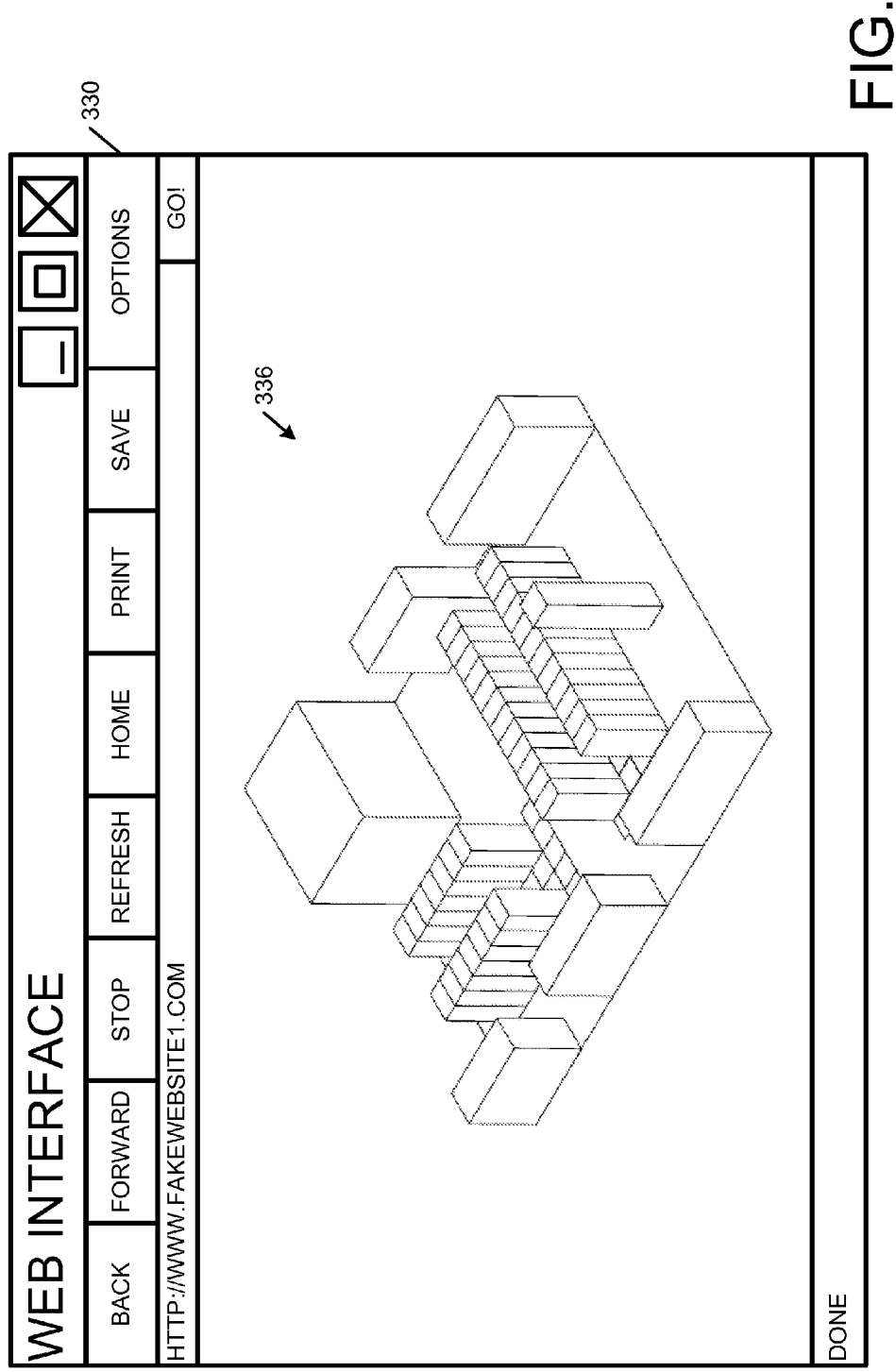
FIG. 3 depicts an exemplary 3-D modeling of a data center, such as the from the network configuration from FIG. 1.

FIG. 3 depicts an exemplary 3-D modeling of a data center 336, such as in the network configuration from FIG. 1. More specifically, the 3-D visualization logic 285 may be configured to provide an interface 330 for displaying the 3-D visual data of a data center 336. Additionally, the 3-D visualization logic 285 may be configured to create a 3-D model of the data center 336, as well as determine at least one point of potential error with regard to the data center 336 or one or more components in the data center 336, as discussed above.

FIG. 4 depicts another exemplary 3-D modeling of a data center, similar to the modeling of the data center 336, from FIG. 3. The nonlimiting example of FIG. 4, however, illustrates an interface 430 configured to provide a visualization of a CFD model in the depicted data center 336. The data for this nonlimiting example may be obtained from a worst case CFD analysis. More specifically, in a worst case analysis, one or more CRACs 108 may be modeled at the CRAC's 108 minimum supply air temperature (SAT). Similarly, a rack 112 may be modeled at a maximum computational capacity based on the hardware contained.

Also included in the nonlimiting example of FIG. 4 is a menu bar 432 for listing at least a portion of the equipment displayed in the 3-D visualization. As illustrated, a user may select one or more of the listed components and/or legend option 434 for accessing additional data. More specifically, the legend option 434 may be configured to provide information regarding the false coloring/shading of the 3-D visualization and/or other data related to the visualization. By selecting one or more of the component options in menu bar 432, the user may be provided with equipment information, such as illustrated in FIGS. 6-11.

One should also note that, while the menu bar 432 is only illustrated in FIG. 4, this is a nonlimiting example. More specifically, depending on the particular configuration, the menu bar 432 (and/or a variation of the menu bar 432) may be provided to a user with any of the interfaces disclosed in FIGS. 3-11. Similarly, this information and/or options may be provided via other displays, such as a horizontal toolbar, one or more icons, etc.

FIG. 5 depicts an additional exemplary 3-D model interface 530 of the data center 336 under current monitoring the data center under current monitoring, similar to the diagram from FIG. 4. In the nonlimiting example of FIG. 5, the interface 530 includes real time thermal response data based on a sensor network installed on the data center 336. As a nonlimiting example, FIG. 5 illustrates that the 3-D visualization logic 285 is configured for determining a thermal metric, calculating the 3-D thermal data, and providing a visualization of the thermal data. A temporary metric may have already been determined, which may be used to visually represent capacity differences between CFD and DSCEM. This metric may be configured to obtain a capacity index (CI), which could be used as a visual estimator to represent how far the data center capacity is from CFD predictions. Supply air temperature (SAT) of each CRAC for a current DSCEM operation (TDSCEM SAT) may be utilized by dividing by the thermal load on the point of interest (DTDSCEM). This may yield a current capacity metric at specific point. The same metric may then be calculated to the nearest point, as predicted by the CFD using (TCFD SAT and (DTCFD)). When this ratio is obtained, the capacity index may be determined. The metric may be calculated for those CRACs that could influence the point of interest.

CRAC influence region may be determined by using a thermal correlation index (TCI) metric. The CI may be a number between 0 and 1 and may be defined, as indicated in equation (1), which depicts a nonlimiting example of a calculation that may be utilized for determining CI. Utilizing equation (1), a CI value of 1 may indicate that the data center has reached its maximum capacity and/or that the current cooling infrastructure is not enough to maintain current or future computing capacity.

$$CI = \frac{\sum_{i}^{n} T_{sat_i}^{DSCEM} / \Delta T^{DSCEM}}{\sum_{i}^{n} T_{sat_i}^{CFD} / \Delta T^{CFD}} \quad (1)$$

Contrary to current solutions, embodiments disclosed herein include data center visualization based on an open model, which could be used with the different tools on the market, and may be configured to provide a unique distinguisher among them: the capability of thermal capacity planning.

Additionally, the CFD logic 281 may be included and implemented using an analysis tool that predicts 3-D airflow, heat transfer and contamination distribution in and around buildings of all types and sizes as input (e.g., Flovent). The CFD logic 281 may be configured to take the geometry and the resulting temperature of the data center and translate this information into an XML format that the 3-D visualization logic understands. The CFD logic 281 may also be configured to calculate different thermal metrics that are not produced by the software, such as thermal correlation index, supply heat index (SHI), local workload placement index (LWPI), etc.

Additionally, the 3-D visualization logic 285 may be configured to receive XML formatted data with the CFD results and the additional thermal metrics and display the results inside the data center scene. At least a portion of these metrics may be visualized as dissecting planes showing colors/shading depending on the metrics bounds in the map (see FIG. 4). The location of each plane can be modified by the user to view the desired area in the data center 3-D scene.

On the other hand, the monitor logic 283 may be configured to communicate with a data storage device 105, such as a DSCEM database, and retrieve temperature sensor information to display in the 3-D scene. The monitor logic 283 may be configured to connect to the monitoring agent (the DSCEM database in this case) and translate data into an XML format, for input to the 3-D monitor. The monitor logic 283 may also be configured to operate as a live streaming provider for the 3-D visualization logic 285. 3-D visualization modes may include actual temperature and temperature versus reference temperature ratio on the racks. Additionally, depending on the particular configuration, temperature bounds may be changed. The monitor logic 283 may be configured to provide detailed specific temperature ranges. Temperature on the racks 112 may be painted on the surface of each rack 112 (e.g., see FIG. 5). For monitoring purposes, the information for racks 112, sensors and CRACs 108 may also be provided. In at least one nonlimiting example, the user may select any of the mentioned objects to obtain the real time information for that object.

Figure 6:
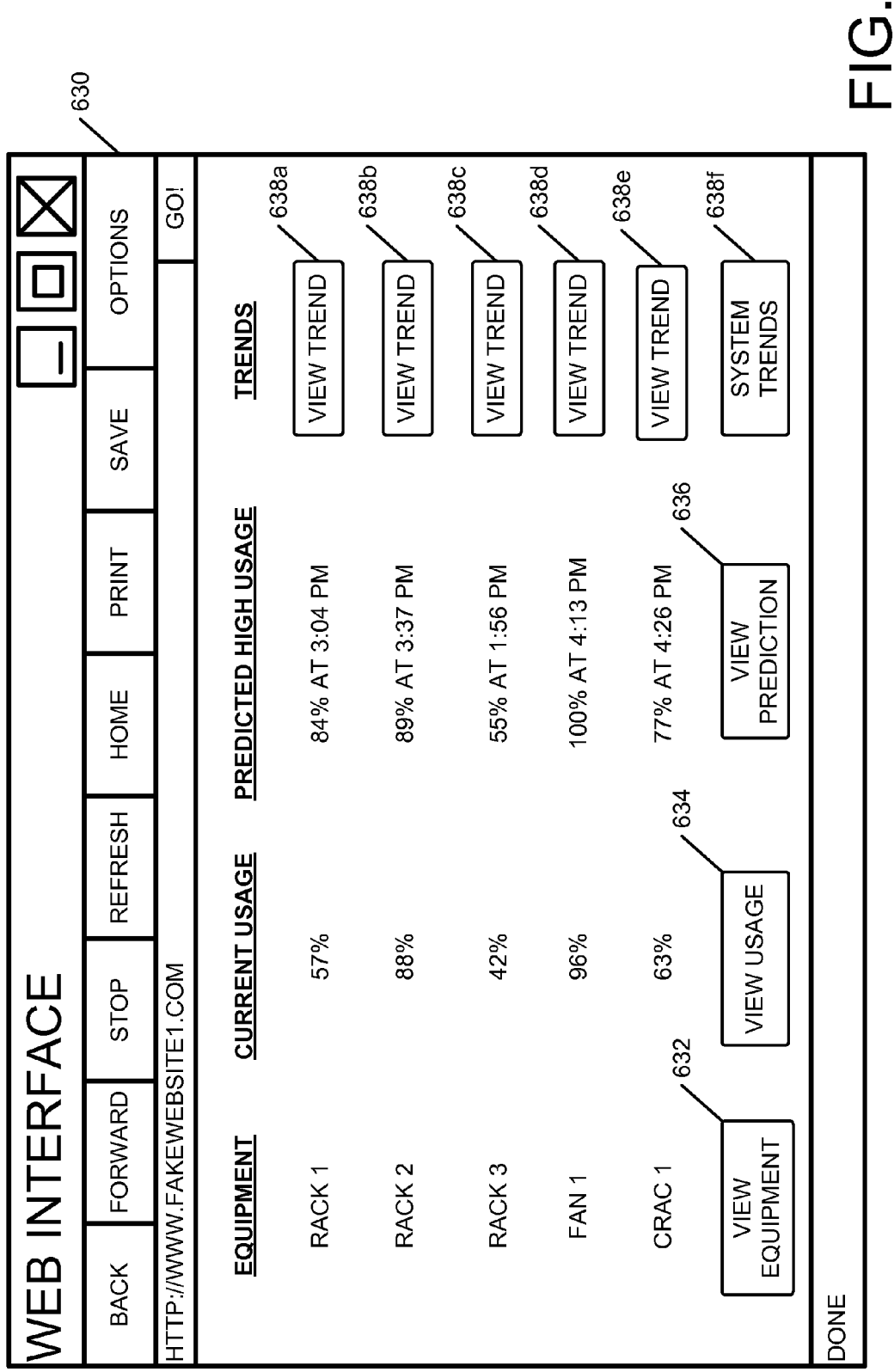
FIG. 6 depicts an exemplary embodiment of an interface for providing data about a data center, such as the data center, from FIG. 1.

FIG. 6 depicts an exemplary embodiment of an interface 630 for providing data about a data center, such as the data center 106, from FIG. 1. As illustrated, the interface 630 may be configured to provide information regarding components of a data center 106, such as the racks 112, fan 110, and CRAC 108. Such data may include current usage data, such as device output compared to a maximum output for that device. Additionally, the interface 630 may be configured to provide predicted high usage, which may indicate the predicted high output of the device during a predetermined interval. The interface 630 may also display the predicted time of the event.

Also included in the nonlimiting example of FIG. 6 is a view equipment option 632, which may be configured to provide additional information about the equipment in the data center 106. A view usage option 634 may also be included to provide additional usage data regarding one or more of the devices in the data center 106. A view prediction option 636 may be provided for providing additional prediction information regarding one or more of the devices associated with the data center 106. View trends option 638*a*-638*f* may be configured to provide trend data for the individual components associated with the data center 106 and/or with the data center as a whole.

Figure 7:
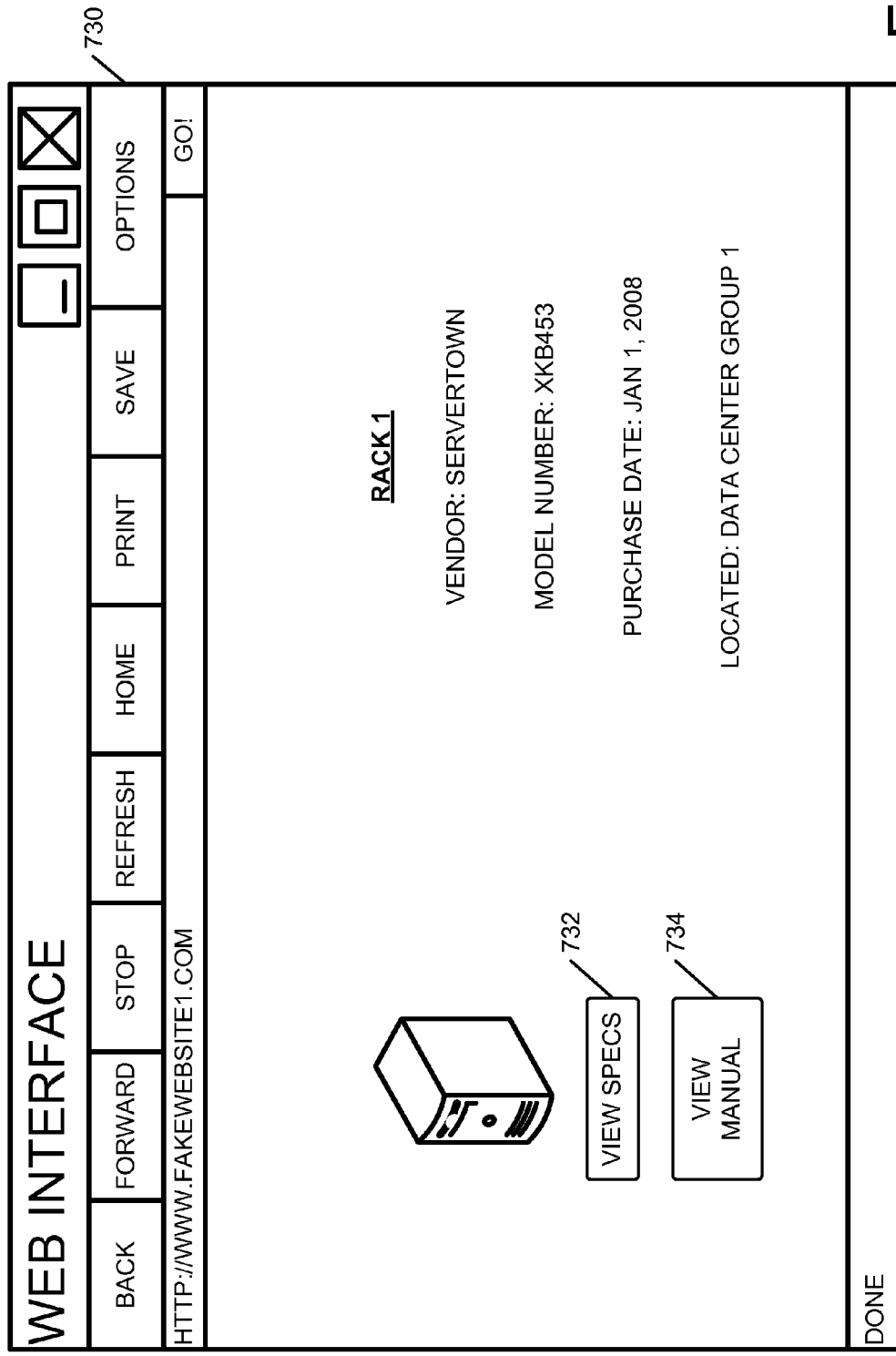
FIG. 7 depicts an exemplary embodiment of an interface, which may be provided in response to selection of the view equipment option, from FIG. 6.

FIG. 7 depicts an exemplary embodiment of an interface 730, which may be provided in response to selection of the view equipment option 632, from FIG. 6. As illustrated in the nonlimiting example of FIG. 7, the interface 730 may be configured to provide specification information via option 732 and a user/technician manual via option 734. Additionally, other data regarding one or more of the components in the data center 106 may be provided.

Figure 8:
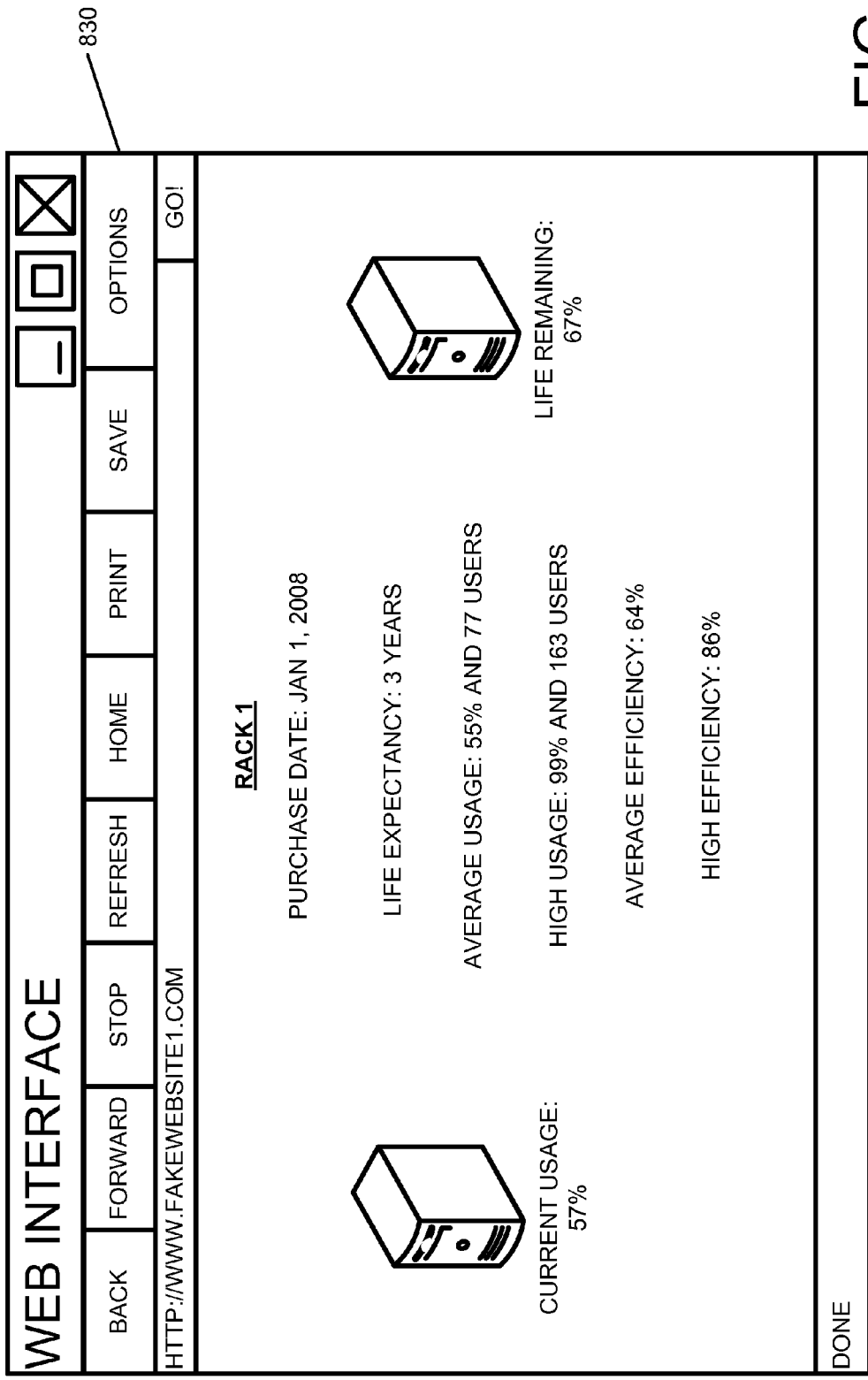
FIG. 8 depicts an exemplary embodiment of an interface that may be provided via selection of the usage option, from FIG. 6.

FIG. 8 depicts an exemplary embodiment of an interface 830 that may be provided via selection of the usage option 634, from FIG. 6. As illustrated in the nonlimiting example of FIG. 8, the interface 830 may include purchase data, component life expectancy, average usage, high usage, average efficiency, and high efficiency. Other data may be provided, such as current usage and expected remaining life for the selected component.

Figure 9:
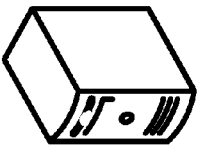
FIG. 9 depicts an exemplary embodiment of an interface, which may be provided in response to selection of the view prediction option, from FIG. 6.

FIG. 9 depicts an exemplary embodiment of an interface 930, which may be provided in response to selection of the view prediction option 636, from FIG. 6. As illustrated in the nonlimiting example of FIG. 9, current usage data, current configuration data (e.g., which components and/or components of users does this piece of equipment serve), current users served, predicted high usage times, predicted low usage times, and configured reallocations may be displayed. Additionally, current usage and predicted usage data is provided. Similarly, a view all reallocations option 932 and a change reallocations option 934 are also provided.

More specifically, in operation, the data center may be configured to reallocate devices based on the changing demand of the data center. As a nonlimiting example, a first rack may be configured to serve a first group of users. However, during peak usage times, the workload of this first group of users may increase to a capacity beyond the reasonable capabilities of the first rack 112. Accordingly, the data center may be configured to dynamically reallocate this device, the first group of users, and/or a portion of the first group of users to more efficiently serve the increased load. Similarly, during times of low activity, workload may be reallocated from a second rack to the first rack. This reallocation may be implemented on a predicted time of high usage; however this is a nonlimiting example. More specifically, the data center 106 may be configured to determine a threshold of activity and automatically reallocate when that threshold is reached. Options for reallocating these configurations may be provided upon selection of the change reallocations option 934.

Figure 10:
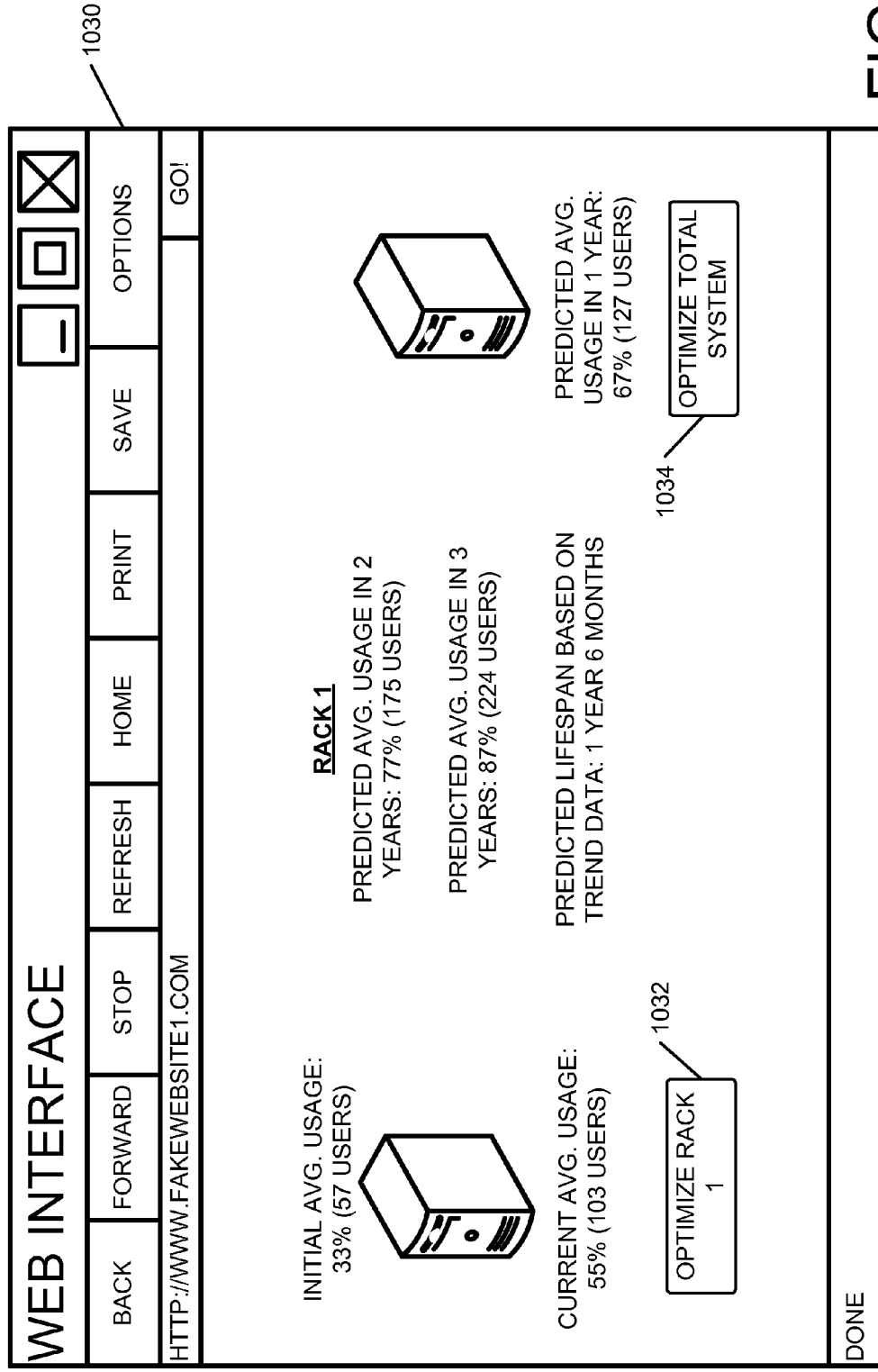
FIG. 10 depicts an exemplary embodiment of an interface, which may be provided in response to a user selection of the view trend option, from FIG. 6.

FIG. 10 depicts an exemplary embodiment of an interface 1030, which may be provided in response to a user selection of the view trend option 638*a*, from FIG. 6. As illustrated in the nonlimiting example of FIG. 10, the interface 1030 may be configured to provide trend data regarding one or more of the components in the data center 106. Such data may include predicted average usage over time, predicted component lifespan, current average usage, initial average usage, and predicted average usage. Additionally provided in the interface 1030 is an optimize rack option 1032 and an optimize system option 1034. The optimize rack option 1032 may be configured to provide additional options to better optimize the selected component, such as options (and/or suggestions) to change allocations of workload, power distribution, etc.

Similarly, optimize system option 1034 may be configured to provide options and/or suggestions for optimizing the entire system.

One should note that while the embodiments of FIGS. 6-10 illustrate providing data to a user in a textual format, this is a nonlimiting example. More specifically, in at least one exemplary embodiment, this data may be graphically depicted, similar to the configurations from FIGS. 3-5. Additionally, the components may be extracted from the rest of the data center, as illustrated in FIGS. 6-10 and shaded/colored to illustrate the desired condition of that device.

Figure 11:
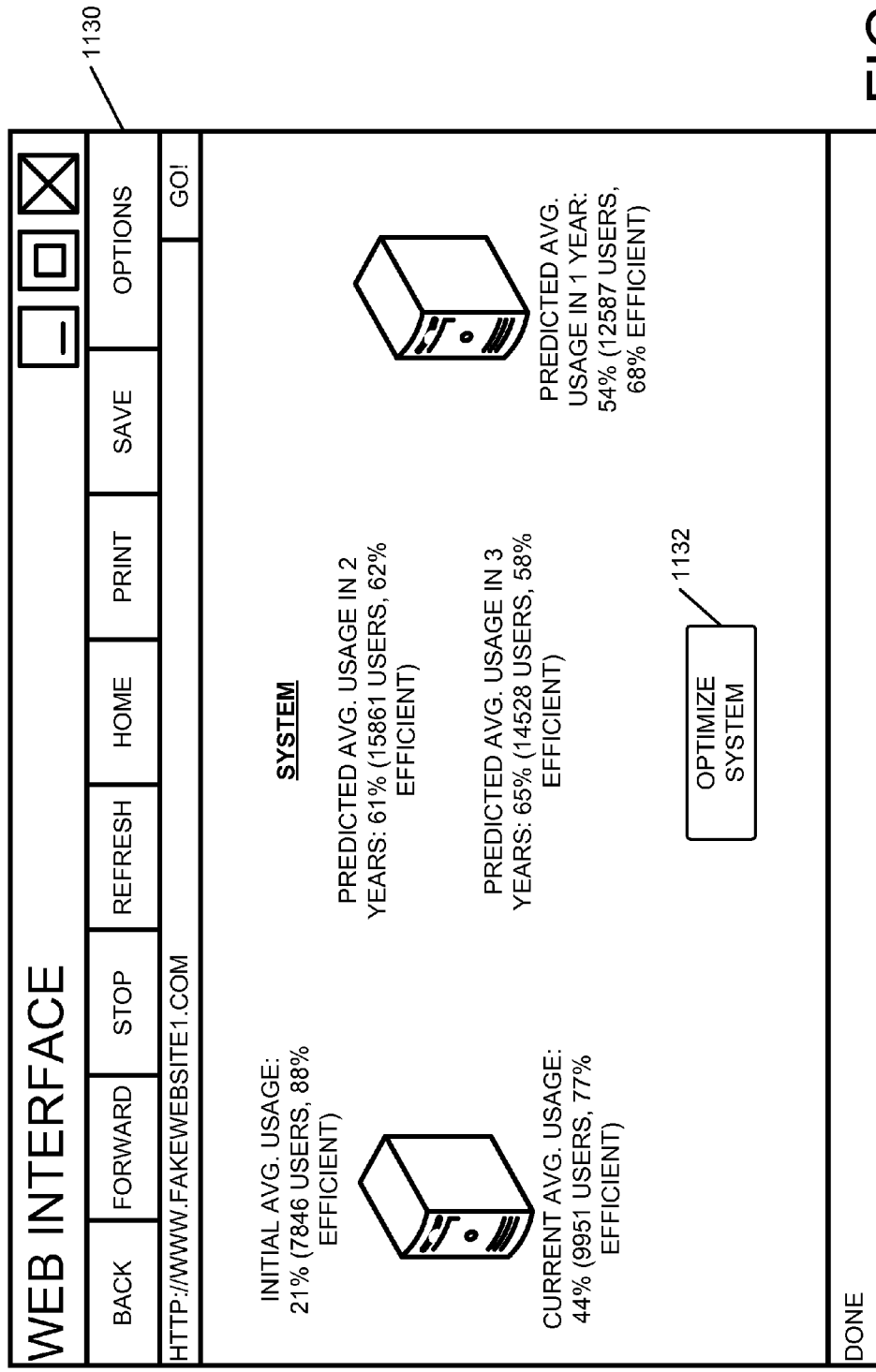
FIG. 11 depicts an exemplary embodiment of an interface, which may be provided in response to a user selection of the view trend option, from FIG. 6.

FIG. 11 depicts an exemplary embodiment of an interface 1130, which may be provided in response to a user selection of the view trend option 638f, from FIG. 6. As illustrated in the nonlimiting example of FIG. 11, the interface 1130 may be configured to provide predicted usage of the system over time, as well as initial average usage of the system, and current average usage of the system. Additionally, similar to FIG. 10, interface 113 provides an optimize system option 1132.

Figure 12:
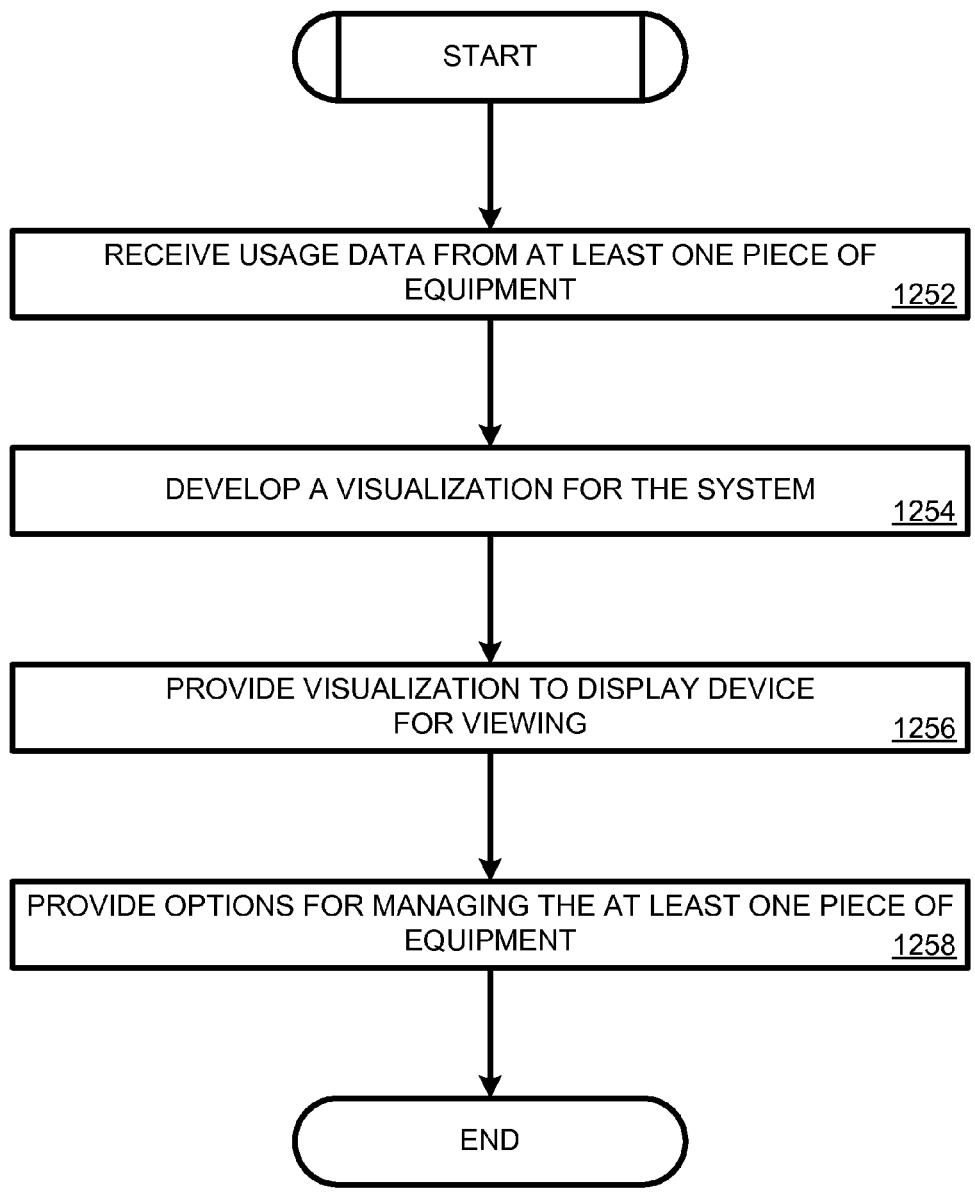
FIG. 12 depicts an exemplary embodiment of a process that may be utilized in the data center from FIG. 1.

FIG. 12 depicts an exemplary embodiment of a process that may be utilized in the data center from FIG. 1. As illustrated in the nonlimiting example of FIG. 12, usage data may be received from at least one piece of data center equipment (block 1252). As discussed above, the usage data may include thermal data, power consumption data, workload data, and/or other data. Additionally, a 3-D visualization may be developed for the system from the usage data (block 1254). The visualization may be provided to a display device for viewing by a user (block 1256). Additionally, options for managing the at least one piece of equipment may also be provided (block 1258).

Figure 13:
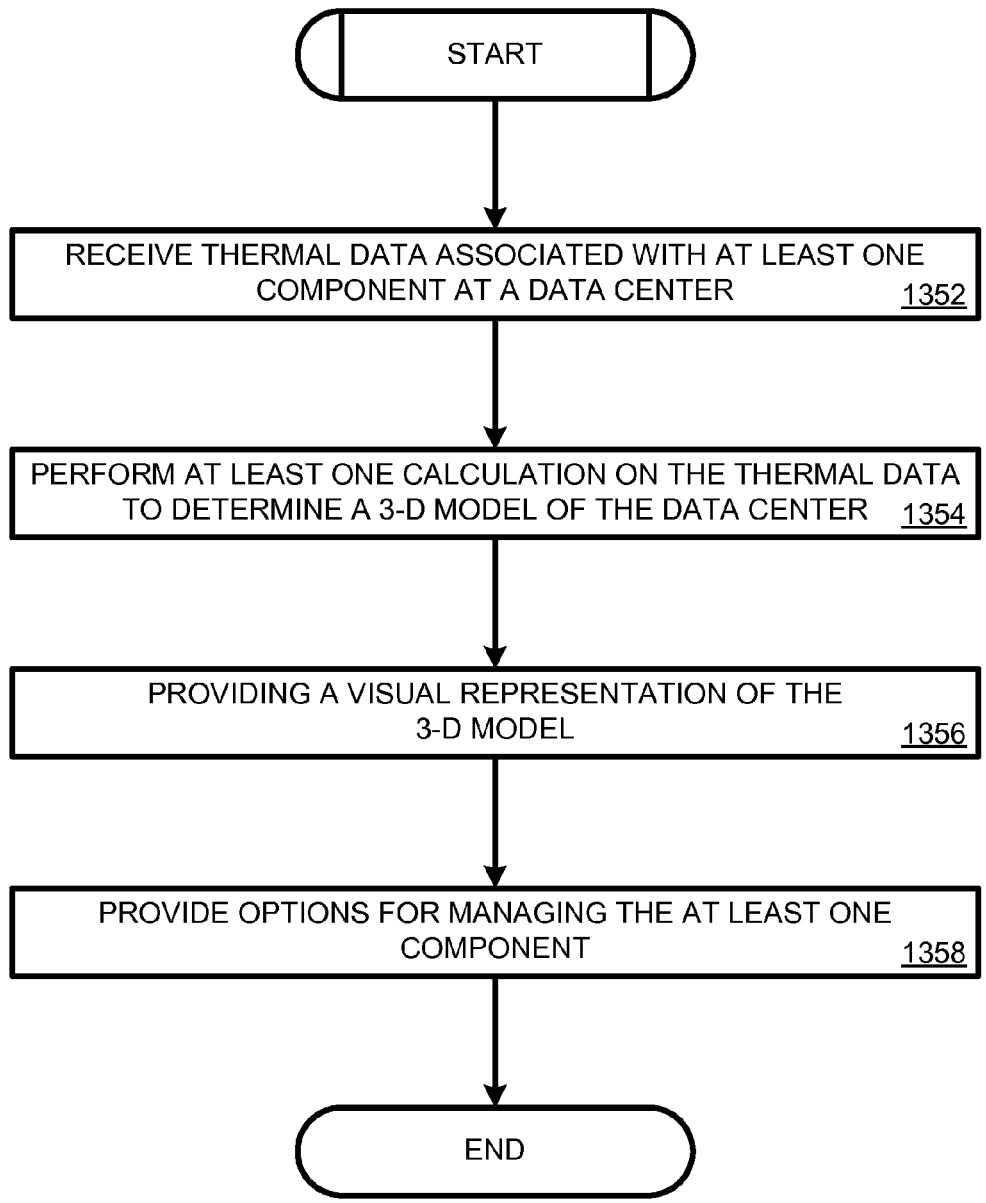
FIG. 13 depicts an exemplary embodiment of a process that may be utilized for providing visual data to a user, similar to the diagram from FIG. 12.

FIG. 13 depicts an exemplary embodiment of a process that may be utilized for providing visual data to a user, similar to the diagram from FIG. 12. As illustrated in the nonlimiting example of FIG. 13, thermal data associated with at least one component at a data center may be received (block 1352). At least one calculation may be performed on the thermal data to determine a 3-D model of the data center (block 1354). A visual representation of the 3-D model may be provided (block 1356). Additionally, options for managing the at least one component may be provided (block 1358).

One should note that while embodiments included herein discuss web-based configurations, one should note that these are nonlimiting examples. More specifically, some embodiments may be utilized without utilizing the Internet.

The embodiments disclosed herein can be implemented in hardware, software, firmware, or a combination thereof. At least one embodiment disclosed herein may be implemented in software and/or firmware that is stored in a memory and that is executed by a suitable instruction execution system. If implemented in hardware, one or more of the embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

The invention claimed is:

1. A method, comprising:
   receiving thermal data associated with at least one component at a data center;
   performing via a processor at least one calculation on the thermal data to determine a 3-dimensional (3-D) model of the data center;
   determining, from the 3-D modeling, at least one point of potential error;
   providing, based on the thermal data, a 3-D visualization of the data center, the 3-D visualization configured to provide visual representation of the at least one point of potential error; and
   determining trend of the at least one component, wherein the trend includes predicted average usage over time of the at least one component, predicted lifespan of the at least one component, current average usage of the at least one component, and predicted average usage of the at least one component, and the 3-D visualization includes the trend.

2. The method of claim 1, further comprising providing at least one option for managing the at least one component.

3. The method of claim 2, wherein the at least one option includes at least one of the following: an option to view component information, an option to view component usage, an option to view prediction data, an option to view trend data, an option to view reallocations, and an option to change reallocations.

4. The method of claim 1, wherein the 3-D model includes at least one of the following: a computer fluid dynamics (CFD) visualization and a modeling visualization.

5. The method of claim 1, further comprising predicting future usage of the at least one component.

6. The method of claim 1, wherein the at least one component includes a server, a fan and a computer room air conditioning unit (CRAC).

7. The method of claim 1, wherein the visual representation of the 3-D model includes a false color representation indicating thermal data of the data center.

8. A system, comprising:
at least one processor;
a computer fluid dynamics (CFD) component, executed by the at least one processor, to model a data center, the data center including at least one component;
a monitor component, executed by the at least one processor, to receive data associated with the modeled data center and translate the received data for 3-dimensional (3-D) modeling, wherein the monitor component is further to receive current usage of the at least one component, and the at least one processor is to determine expected remaining life for the at least one component and predicted high and low usage times for the at least one component;
a diagnostics component, executed by the at least one processor, to determine via a processor, from the 3-D modeling, at least one point of potential error; and
a 3-dimensional (3-D) visualization component, executed by the at least one processor, to receive the translated data and provide a 3-D visualization of the data center, the 3-D visualization configured to provide visual representation of the at least one point of potential error, wherein the 3-D visualization component is further to display a reallocation of components of the data center in the 3-D visualization based on the current usage, the expected remaining life, and the predicted high and low usage times.

9. The system of claim 8, wherein the at least one component includes a server, a fan and a computer room air conditioning unit (CRAC).

10. The system of claim 8, wherein the 3-D visualization component is further executed by the at least one processor to provide a user interface for providing the 3-D visualization.

11. The system of claim 10, wherein the user interface is to provide at least one of the following: an option to view component information, an option to view component usage, an option to view prediction data, an option to view trend data, an option to view reallocations, and an option to change reallocations.

12. The system of claim 8, wherein the 3-D visualization component is further executed by the at least one processor to provide at least one of the following: a computer fluid dynamics (CFD) visualization and a modeling visualization.

13. The system of claim 8, wherein the at least one processor is to determine a trend of the at least one component, wherein the trend includes predicted average usage over time of the at least one component, predicted lifespan of the at least one component, current average usage of the at least one component, and predicted average usage of the at least one component, and the 3-D visualization component is further executed by the at least one processor to display the trend in the 3-D visualization.

14. A non-transitory computer readable medium including machine readable instructions executed by at least one processor to:
receive thermal data associated with at least one component at a data center;
perform at least one calculation on the thermal data to determine a 3-dimensional (3-D) model of the data center; and
determine, from the 3-D model, at least one point of potential error;
provide, based on the thermal data, a 3-D visualization of the data center in a user interface, the 3-D visualization configured to provide visual representation of the at least one point of potential error;
determine current thermal operation from the received thermal data for the at least one component;
predict a maximum thermal operation according to computer fluid dynamics (CFD) for the at least one component;
determine a metric from the determined current thermal operation and the predicted maximum thermal operation representing differences between current operation of the at least one component and the prediction; and
display the metric in the user interface.

15. The non-transitory computer readable medium of claim 14, wherein the machine readable instructions are executed by at least one processor to provide at least one option for managing the at least one component.

16. The non-transitory computer readable medium of claim 15, wherein the at least one option includes at least one of the following: an option to view component information, an option to view component usage, an option to view prediction data, an option to view trend data, an option to view reallocations, and an option to change reallocations.

17. The non-transitory computer readable medium of claim 14, wherein the 3-D model includes at least one of the following: CFD visualization and a modeling visualization.

18. The non-transitory computer readable medium of claim 14, wherein the machine readable instructions are executed by at least one processor to:
determine current usage data of the at least one component;
determine expected remaining life for the at least one component and predicted high and low usage times for the at least one component; and
generate and display a reallocation of components of the data center in the 3-D visualization based on the current usage, the expected remaining life, and the predicted high and low usage times, wherein the at least one component includes a server, a fan and a computer room air conditioning unit (CRAC).

19. The non-transitory computer readable medium of claim 14, wherein the machine readable instructions are executed by at least one processor to determine a trend of the at least one component, wherein the trend includes predicted average usage over time of the at least one component, predicted lifespan of the at least one component, current average usage of the at least one component, and predicted average usage of the at least one component, and wherein the at least one component includes a server, a fan and a CRAC, and the 3-D visualization includes the trend.

20. The method of claim 1, comprising:
- determining current usage data of the at least one component;
- determining expected remaining life for the at least one component and predicted high and low usage times for the at least one component; and
- generating and displaying a reallocation of components of the data center in the 3-D visualization based on the current usage, the expected remaining life, and the predicted high and low usage times.

\* \* \* \* \*